(12) United States Patent
Okamoto

(10) Patent No.: US 12,153,593 B1
(45) Date of Patent: Nov. 26, 2024

(54) METHOD AND SYSTEM FOR DATA MINING LAYERS

(71) Applicant: Russell Okamoto, Beaverton, OR (US)

(72) Inventor: Russell Okamoto, Beaverton, OR (US)

(*) Notice: Subject to any disclaimer, the term of this patent is extended or adjusted under 35 U.S.C. 154(b) by 409 days.

(21) Appl. No.: 17/705,345

(22) Filed: Mar. 27, 2022

Related U.S. Application Data

(60) Provisional application No. 63/166,972, filed on Mar. 27, 2021.

(51) Int. Cl.
*G06F 16/2458* (2019.01)
*G06F 16/242* (2019.01)
*G06F 16/248* (2019.01)
*G06F 16/28* (2019.01)

(52) U.S. Cl.
CPC ...... *G06F 16/2465* (2019.01); *G06F 16/2423* (2019.01); *G06F 16/2425* (2019.01); *G06F 16/248* (2019.01); *G06F 16/287* (2019.01)

(58) Field of Classification Search
CPC ............. G06F 16/2465; G06F 16/2423; G06F 16/2425; G06F 16/248; G06F 16/287
USPC ........................................................ 707/769
See application file for complete search history.

(56) References Cited

U.S. PATENT DOCUMENTS

| | | | |
|---|---|---|---|
| 7,143,107 B1* | 11/2006 | Nebres, Jr. | G06F 16/2423 707/999.005 |
| 8,732,193 B2* | 5/2014 | Skeen | G06F 16/9537 705/26.1 |
| 2020/0184278 A1* | 6/2020 | Zadeh | G06N 3/044 |

* cited by examiner

*Primary Examiner* — Sheree N Brown

(57) ABSTRACT

Data mining tools often require users to learn arcane query syntax and complex user interfaces in order to compose data mining queries. A "stratigraph" is a data mining tool that enables non-programmers to explore data by visually assembling queries through direct manipulation and rendering query results in "layers". Each layer—one for each predicate of a query—can be subsequently filtered by selecting a value from the current layer. Selecting a value in a layer expands the layer to produce a higher layer based on the selected value, all previous layer predicates, and the next user-specified predicate. As exploration continues upward, layers build on top of each other, forming query "spires" that become visual query landmarks. This interactive exploration process is evocative of how geologists decode the story of rock formations by analyzing how strata evolve. Hence the name "stratigraph" is an homage to this science of stratigraphy.

1 Claim, 5 Drawing Sheets

Mass Shootings [People] 2013 - 2019

METHOD AND SYSTEM FOR DATA MINING LAYERS

CROSS-REFERENCE TO RELATED APPLICATION

This invention claims the benefit of the provisional patent application "Methods And System For Data Mining Layers" filed Mar. 27, 2021 with Application No. 63/166,972 and Confirmation Number 5181.

INVENTOR

Russell Okamoto

FIELD OF THE INVENTION

This disclosure relates to systems and methods for data mining and visualization.

BACKGROUND OF THE INVENTION

Data mining tools often require users to understand arcane query syntax and to learn complex user interfaces in order to compose data mining queries. What's needed is a system and method for data mining that gives non-programmers the power to intuitively construct data mining queries through direct manipulation (just pointing and clicking and without knowledge of underlying query languages) and to visualize data mining results in a form that encourages interactive exploration and discovery.

SUMMARY OF THE INVENTION

The present disclosure describes a data mining tool called a "stratigraph".

A stratigraph lets non-programmers explore data by visually assembling queries through direct manipulation and rendering query results in "layers". Each layer—one for each predicate of a query—can be subsequently filtered by selecting a value from the current layer. Selecting a value in a layer expands (zooms) the layer to produce a higher layer based on the selected value, all previous layer predicates, and the next user-specified predicate. As exploration continues upward, layers build on top of each other, forming query "spires" that become visual query landmarks. This interactive exploration process is evocative of how geologists decode the story of rock formations by analyzing how strata (layers) evolve. The name "stratigraph" is an homage to this science of stratigraphy.

DESCRIPTION OF THE DRAWINGS

Both FIG. 1 and FIG. 2 show how a stratigraph implements accordion behavior to dynamically widen blocks to make blocks visible and selectable.

DETAILED DESCRIPTION

Figure 1:
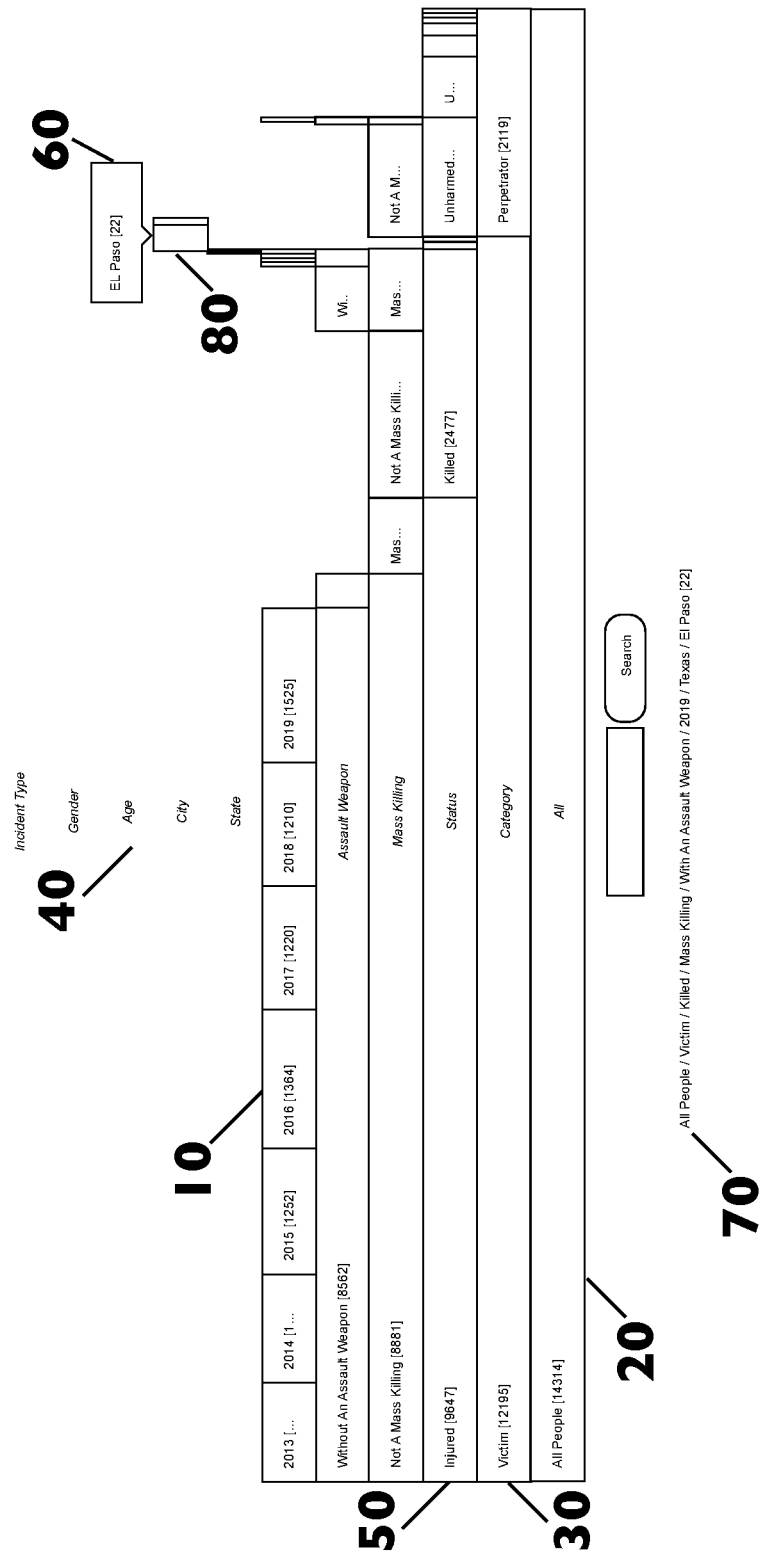
FIG. 1 is a diagram of a stratigraph for a mass shootings database used in an example embodiment of the present disclosure.

The stratigraph creates and visualizes data queries (currently SQL-based) made up of multiple predicates conjunctively (AND'd) joined together. As shown in FIG. 1 For a given query, the stratigraph calculates groups with row counts for each predicate and renders each group as a "block" 10 within its predicate layer. Groups with larger row counts are rendered as blocks with larger widths within the block's query predicate layer. The root (bottom) layer 20 of the stratigraph shows the unfiltered count of the primary query key of interest. Results of a first query predicate render as the first layer 30 above the root layer. In turn, subsequent predicates and their grouped results (which are filtered by previous predicates) render on top of their preceding (ancestor) layers.

The stratigraph in FIG. 1 is built from queries composed of predicates AND'd together—shown as italicized labels within each layer's background 40—these predicates match database columns for:

"Category", "Status", "Mass Killing", "Assault Weapon", "Year", "State", "City", "Age", "Gender", "Incident Type"

The root layer of this stratigraph is labeled "All People". This root layer shows the database contains a total of 14314 "People". Moving up layer by layer, of these "People", 12195 are "Victims" and 2119 are "Perpetrators". Of the "Victims", there are 9647 "Injured" and 2477 "Killed". The third layer 50 shows grouped row counts for the "Status" predicate (column). Specifically, the query for this "Status" layer is:

/*Shows counts for "Status" values between 'Jan. 1, 2013 and Dec. 31, 2019' for Victims*/SELECT P. 'Status', COUNT (*) FROM Incidents I JOIN Participants P ON I. 'Incident ID'=P. 'Incident ID' WHERE (I. 'date' between '2013 Jan. 1' and '2019 Dec. 31') AND (P.Type='Victim') GROUP BY P. 'Status'

This "Status" layer query produces several blocks—one for each group by result—"Injured", "Killed", "Unharmed", etc. These blocks are arranged horizontally to make up the "Status" layer. Block widths are based on group by counts.

Selecting a block in a layer expands the layer and produces a descendent layer above it. This progressive expansion of query layer predicates forms query "spires". Multiple query spires can originate from separate values within a layer.

As shown in FIG. 1, the top predicate of the highlighted spire is "City" and the tooltip shows "El Paso [22]" 60 for the selected block within the query spire. The label at the bottom of the image 70 shows the spire is built up from layer blocks from bottom to top:

All People/Victim/Killed/Mass Killing/With An Assault Weapon/2019/Texas/El Paso

This query spire translates as:

In 2019, in El Paso, Texas, 22 victims were killed in a mass killing (4+ people total killed at the incident) with an assault weapon The stratigraph enables non-programmers to easily construct arbitrary database queries via direct manipulation. Queries on the underlying database are triggered by pointing and clicking block values. No typing of input parameters is needed. No understanding of underlying query syntax is needed.

Figure 2:
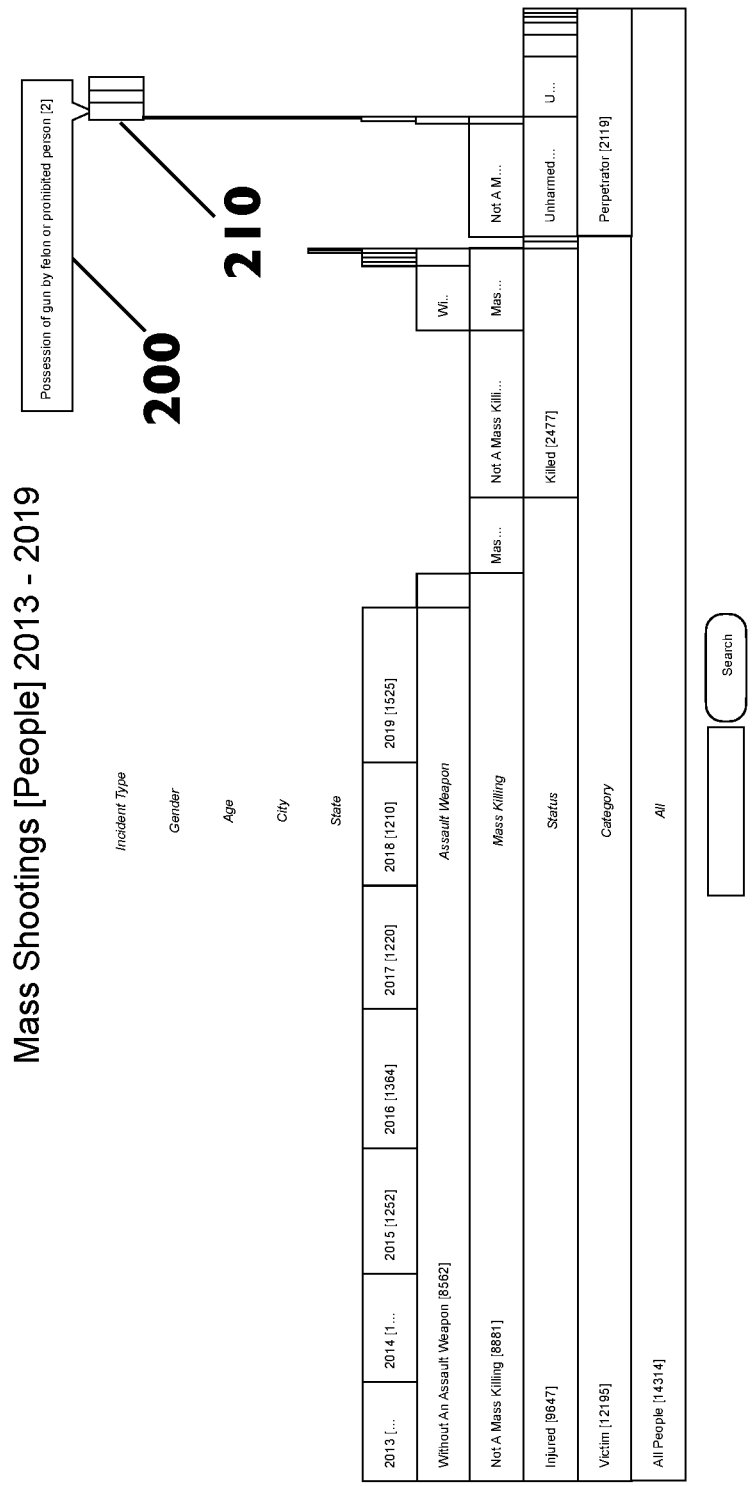
FIG. 2 is a diagram of a stratigraph highlighting a query spire.
Figure 3:
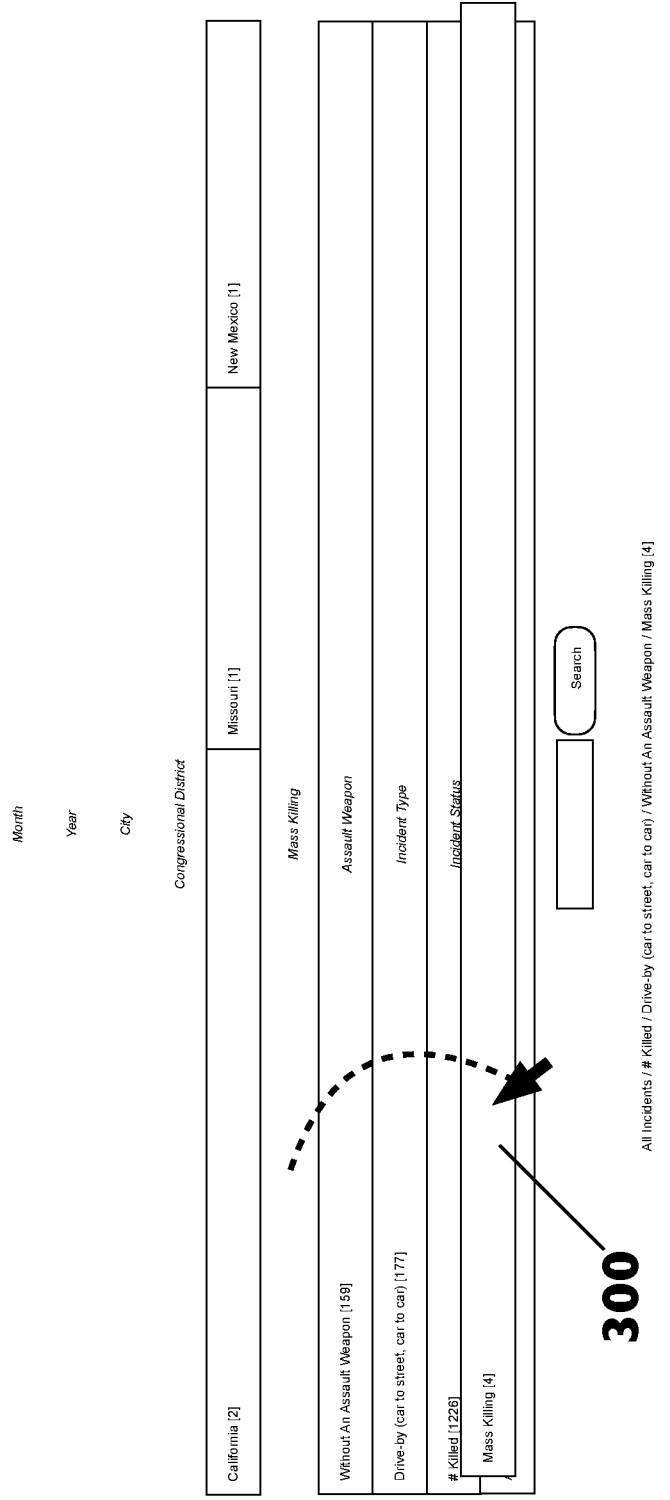
FIG. 3 is a diagram of a stratigraph showing dragging and dropping of a layer to reorder query predicates.

FIG. 2 shows another query spire 200 where "Perpetrators" was selected as the first predicate above "All People" and then block values were selected for higher layers. In plain words the query spire shows:

> In 2016, in Pittsburgh, Pennsylvania, 2 adult, male perpetrators were unharmed and arrested for a mass killing (4+ people total killed at the incident) with an assault weapon, and the perpetrators were in possession of a gun as a felon or prohibited person To encourage exploration of the database and to hone in on specific queries of interest, layers of the stratigraph can be dragged and dropped to change the total ordering of query predicates. As shown in FIG. 3, the "Mass Killing" layer is dragged from the fifth layer of the stratigraph to become the second layer beneath "Incident Status" 300. This drag and drop instantly and conveniently reorders the predicates of the query via direct manipulation.

Figure 4:
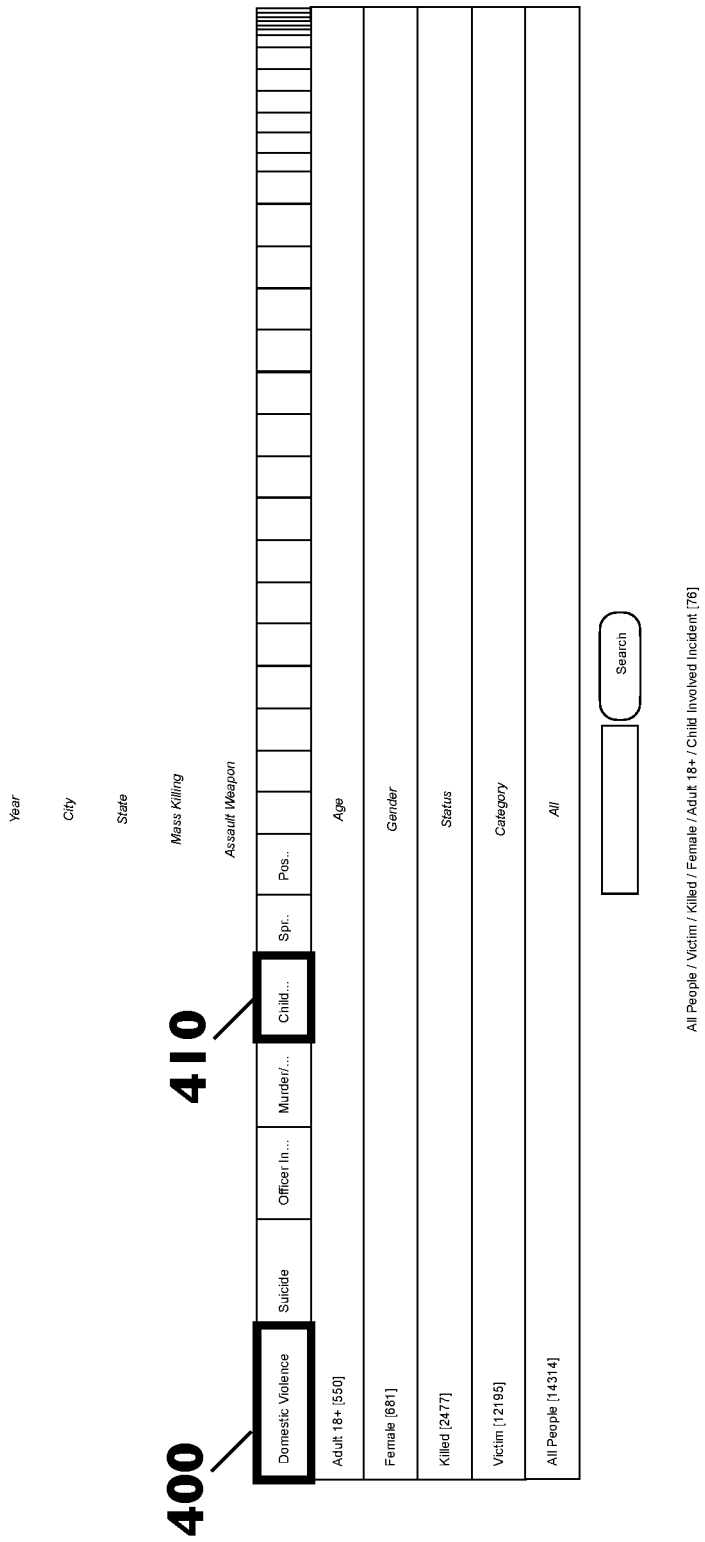
FIG. 4 is a diagram of a stratigraph showing multi-selecting to AND predicate values together.

In addition, for layers where multi-predicate value selection is desirable, multiple blocks in these layers can be AND'd (or OR'd) together by holding down a predetermined key for example the TAB (or META) key while clicking on each block. As shown in FIG. 4, multiple blocks 400 and 410 in the "Incident Type" layer can thus be AND'd together.

Blocks within layers often correspond to a group with a single row count. Such blocks are one pixel wide and so cannot be readily moused over and selected. To address this user interface challenge, the stratigraph invents an "accordion" animation scheme whereby blocks are visually inflated—yet retain their rectilinear shape—as a pointer moves over thin blocks. As shown in FIG. 1 and FIG. 2, this scheme expands thin blocks 80 and 210 as they are moused over and labels the blocks with a tooltip, thus enabling a user to readily select any block regardless of its original width. As a further user interface advantage—unlike a fisheye lens scheme which deceptively and undesirably makes narrower blocks temporarily wider than adjacent blocks—this accordion scheme preserves the relative widths of adjacent blocks enabling block values to be readily compared.

Figure 5:
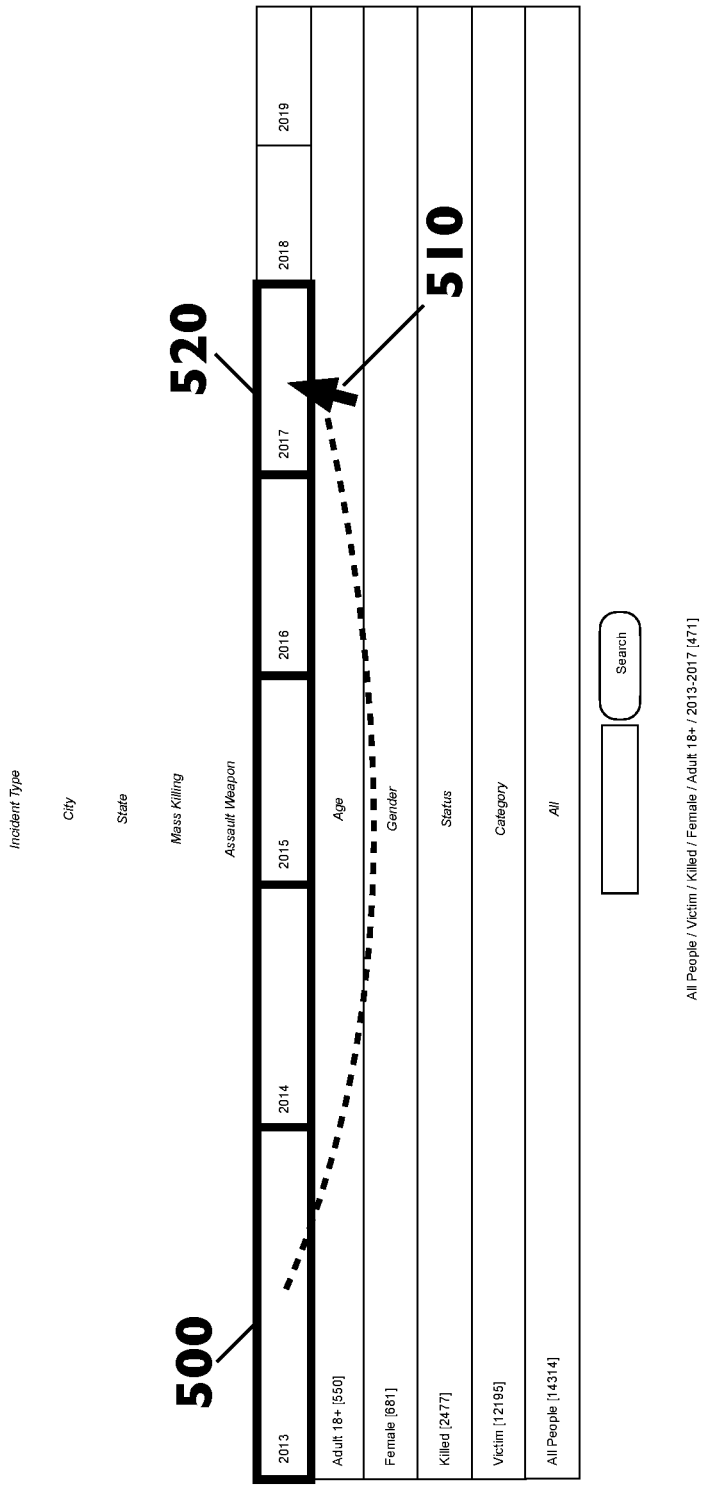
FIG. 5 is a diagram of a stratigraph showing how a range of values can be selected via direct manipulation for comparison-based range predicates.

As shown in FIG. 5, blocks can be arranged left to right within a layer based on a sorting order for block values, e.g. blocks with numerical or date values can be sorted and arranged by ascending or descending order. A range of values can be demarcated for comparison-based range predicates via direct manipulation by selecting a predetermined key (e.g. SHIFT key) or user interface element, selecting a first block in a layer 500 to define a start value for a comparison range, and then dragging 510 to select a final block 520 which expands the comparison range and defines an end value for the comparison range.

What is claimed is:

1. A non-transitory computer-readable medium containing program instructions for causing a computer to perform a method of mining data, comprising:
   calculating by a computer, aggregate functions on groups produced for each predicate of a query;
   rendering by a computer, each group as a visual block where a block's dimensions and label are defined by a group identifier and aggregate function value;
   arranging by a computer, blocks for a predicate into a layer and labeling the layer with a predicate identifier;
   stacking by a computer, layers of a query from bottom to top or top to bottom to show the filtering order of predicates in a query;
   expanding the size of blocks in a layer while maintaining the relative size of adjacent blocks as a selection device moves over a block thus making a block more readily visible and selectable;
   selecting a block in a layer to produce a next higher layer resulting from execution of a query filtered by a predicate match for the selected block's value, predicate matches for blocks selected in lower layers, and the predicate identifier of the next higher layer;
   refining a query by selecting blocks from each layer to build up visual query land marks;
   dragging and dropping layers above or below another layer to reorder predicate filtering of a query;
   rebuilding by a computer, query spires automatically when query predicates are reordered;
   selecting a predetermined key or user interface element while selecting multiple blocks in a layer to logically AND predicate values;
   selecting a predetermined key or user interface element while selecting multiple blocks in a layer to logically OR predicate values;
   laying out by a computer, blocks left to right or right to left within a layer based on a sorting order for block values;
   selecting a predetermined key or user interface element while selecting a first block in a layer to define a start value for a comparison range and dragging to adjacent blocks to expand the comparison range and thus define the endpoints of a comparison range via direct manipulation;
   rendering by a computer, a label that shows a sequence of predicate and block values that comprise a selected spire.

\* \* \* \* \*